April 6, 1954

F. J. TRAINOR 2,674,120

HYDROMETER

Filed April 2, 1953

INVENTOR

FOSTER J. TRAINOR

BY Henry Heyman

ATTORNEY

Patented Apr. 6, 1954

2,674,120

UNITED STATES PATENT OFFICE 2,674,120

HYDROMETER

Foster J. Trainor, Holly Hill, Fla.

Application April 2, 1953, Serial No. 346,465

3 Claims. (Cl. 73—33)

Figures 1, 2, 3, 4, 5:
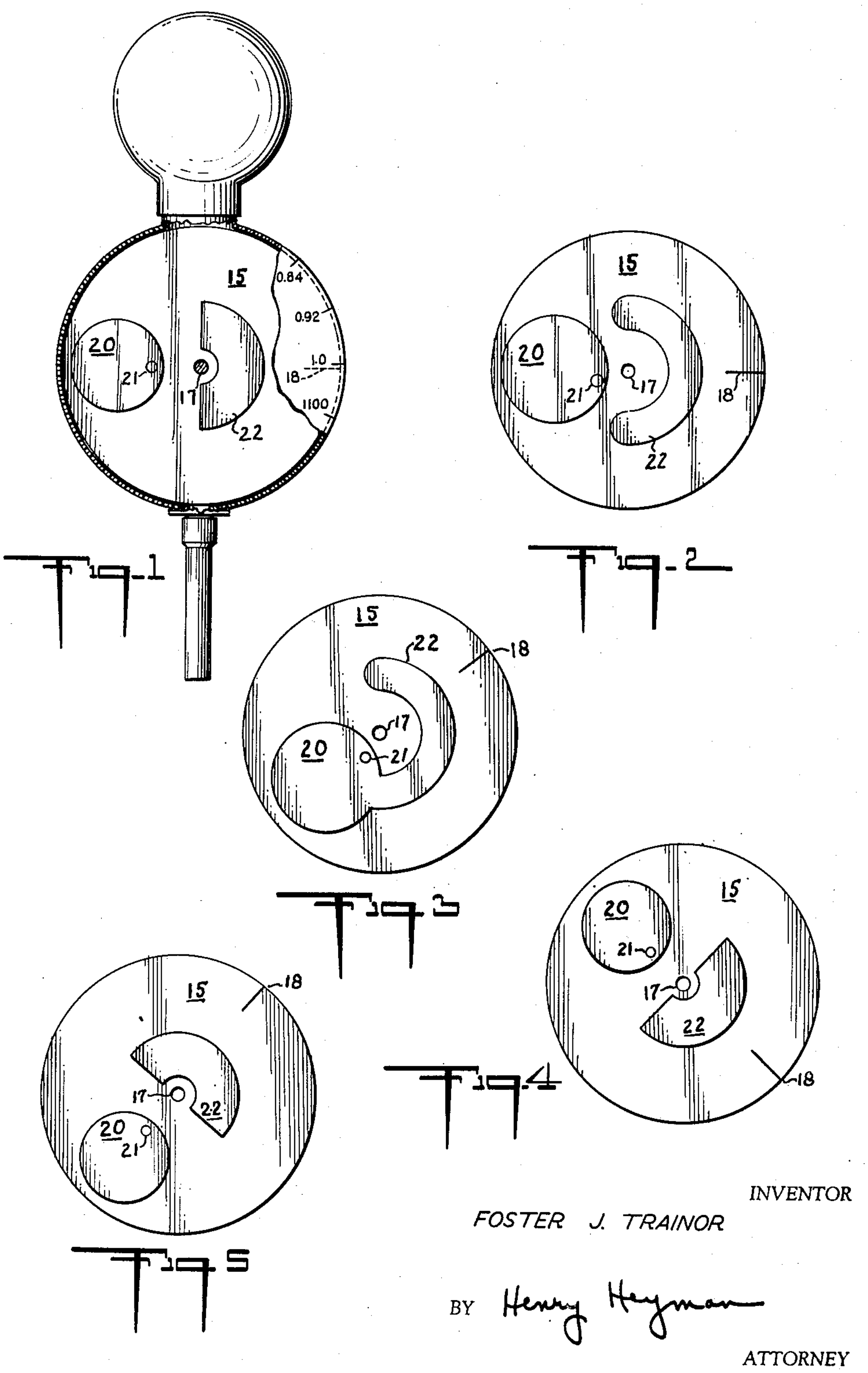

This invention is a continuation-in-part of application S. N. 235,774, filed July 9, 1951 and relates to hydrometers and more specifically is directed to a self-compensating hydrometer float of the disc type.

The hydrometer of the referenced parent case and of this case comprises a flat circular disc which is pivoted on an axle centrally located and transverses to the plane of the discs. At an approximate point on its surface, the disc is provided with a pointer line. The housing is likewise flat, is constructed at least in part of transparent material and is provided on its surface with indicia corresponding to specific gravity.

The disc hydrometer float of the referenced parent application S. N. 235,774 is circular in shape for approximately 270° of its perimeter and has a portion of its material removed from the perimeter line inward over an arc of approximately 90°. The purpose of the perimeter relieved portion is to provide a differential in balance of the disc about its axis when immersed in fluid and also to provide an expanded scale. A small weight such as a lead pellet is inserted in a small aperture in the disc so as to cause it to balance when immersed in unity density fluid with an indicia mark on the float aligned with the unity indicia mark on the hydrometer casing. Further, in the float disc of the referenced parent application, in a position proximate the small weight a buoyant element in the form of a circular piece of material of less density than the body of the disc is affixed to the disc. This buoyant element is of density less than one and is of an acid inert substance like polyethylene. This material has a coefficient of expansion very nearly the same as water and accordingly expands and contracts with temperature at a rate approximating that of the water solution being tested. The hydrometer is therefore substantially self-temperature correcting.

It has been discovered that although the hydrometer of application S. N. 235,774 has improved characteristics over hydrometers of the prior art, that improved versatility was desirable. For example, where change in the angular position of the hydrometer disc float is simply proportional to changes in the density of the liquid being tested, it is subject to incomplete compensation because the density variations are different for different concentrations of the solution being tested. Accordingly, to obtain more accurate temperature compensation, an improved means of compensation was needed.

Accordingly it is a primary object of this invention to provide a disc type hydrometer float which has substantially complete temperature compensation for solutions of different proportionalities.

Other objects of the invention will become apparent from a further reading of this description taken in connection with the accompanying drawing made a part of this specification.

Referring to the drawing.

Figure 1 shows in elevation a view partly in cross section of a complete flat type hydrometer fabricated in accordance with my invention, Figure 2 shows a second embodiment of my hydrometer disc, Figure 3 shows a third embodiment, Figure 4 shows the embodiment of Figure 1 in a position when testing a high density liquid and Figure 5 shows the embodiment of Figure 1 when testing a less dense liquid.

The disc 15 is preferably circular in shape and has a radial pointer mark 18 on its surface at one point proximate the perimeter thereof. At a position opposite the pointer mark a main displacement member 20 having a fixed rate of thermal expansion is provided. This member is preferably in the form of a circular disc rotatably supported in the plane of the disc itself by removing a like portion of the disc itself. The substance of the main displacement member is such as to have a density of less than one and preferably is a substance like polyethylene. This material has a coefficient of expansion very nearly the same as that of water. Accordingly, it expands and contracts at a rate which will compensate for temperature changes of fluids having the temperature coefficient of water.

The disc 15 is pivotally supported for rotation in its own plane in the hydrometer case by a transverse axle 17.

The counterbalance weight 21 is of metal such as lead and is positioned with respect to its radius arm from axle 17 by adjusting the angular position of disc 20 so that the hydrometer disc can be standardized with respect to the scale on the housing for a fluid of any selected density.

Different concentrations of solutions have different expansion coefficients with the result that it is desirable that the hydrometer float modify its expansion effect in accordance with its position of rotation.

The innovation of the invention disclosed in this application resides in a second buoyant member 22 of generally arcuate form positioned 180° from the main buoyant element 20 and with the concavity of the member directed generally toward the axis of the disc. The second member 22 is hereinafter referred to as the cancellation member. As will presently become apparent, the shape of the cancellation member is selected to be such that it compensates for the different temperature coefficients of different concentrations of the liquids in the solution to be tested.

Operation of the second buoyant member 22 is explained by the following example. If the hydrometer is filled with distilled water, i. e., a fluid of unity density and balanced by an appropriate angular position of disc 20, so that the disc assumes the position shown in Figure 1, the mass of member 22 is calculated by dividing the change in volume of distilled water by the change in volume of the material from which the replacement member is made over a selected temperature range.

For distilled water this thermal expansion has been determined to be .0466 for a temperature range of from zero centigrade to 100 degrees centigrade. For polyethylene plastic for the same temperature, the change in volume is .1080. Therefore, the change of volume of polyethylene divided by the change of volume of water over the selected temperature range is 0.43. Accordingly, to the above figures, the cancellation member is chosen to have a mass which is 1–0.43 or 57% of the main buoyant member 20.

The cancellation member 22 need not have the same coefficient of expansion as the substance, for example, ethylene, glycol, added to, for example, water to make a solution.

With the cancellation member 22 shown in Figure 1 of the drawing, when immersed in distilled water, and ethylene glycol added, the disc rotates in a clockwise direction and rests in a new position indicative of the change in density. As the density is increased by additional additions of ethylene glycol, the disc rotates further as shown in Figure 4, but the temperature coefficient of the solution increased. However, with additional rotation of the disc, the lower portion of the cancellation member passes a vertical median line and balances out a like portion of the cancellation member to the right of the median line. The remaining portion of the cancellation member effectively cancels out only a portion of the expansion effect of the main member 20. Consequently, the resultant effective remainder of the cancellation member has an expansion effect which is substantially equal to that of the solution. Therefore, for any selected concentration of solution, the disc will maintain the same position throughout the selected temperature range.

In the event, a fluid having a specific gravity of less than one is added to water, the disc will take a position such as shown in Figure 5 and again the cancellation member 22 will rotate into a position such that it will compensate for the non-linear relationship between solution concentration and temperature.

The modification shown in Figure 2 provides a cancellation member the mass of which is symmetrical about an arc having its center coincident with the center of rotation of the disc. This form is preferred for symmetrical compensation behavior for solutions which may vary from above to below, or vice-versa, the density of pure water.

The embodiment of Figure 3 discloses that the cancellation member 22 can be positioned so its median point is other than 180° opposed to the main buoyant member 20. The cancellation member may at one end be contiguous with the main member 20 so that it may form a single, fully compensating displacement-cancellation member. This embodiment is preferred for solutions which undergo a maximum density variation.

What I claim is:

1. A hydrometer comprising a flat transparent syringe adapted to be utilized with the plane of the large dimension vertical, a disc pivotally supported in the syringe on an axle centrally located and transverse to its plane, there being a pointer mark on said disc adapted to cooperate with a scale of specific gravity readings on said syringe case, a first buoyant element of circular flat shape pivotally supported in the disc between the center and the periphery on a radius opposite to the pointer line, a small weight element in said first buoyant element, a second buoyant element of elongated substantially arcuate shape supported in said disc between the center of the disc and the pointer mark and with the concavity of the arcuate shape facing the said center of the disc.

2. A hydrometer float comprising a disc adapted to be pivotally supported for rotation on an axis normal to said disc and passing through its center, a first buoyant element of flat circular shape supported in said disc between the axis and the periphery thereof, a second buoyant element of arcuate shape extending over an arc of approximately 180° supported in said disc with its median point on a radius substantially opposite a radius passing through the first buoyant element, and with the concavity of said arcuate shape facing the axis of said disc.

3. A hydrometer float comprising a disc adapted to be pivotally supported on an axis normal to the plane thereof, a first buoyant element supported on a radius between the axis and the periphery, a second buoyant element of arcuate shape supported in said disc with the arc of the second buoyant element being substantially 180° and lying on a circle generated by the end of a radius of less length than the radius of the disc and on a semi-circle opposed to the semi-circle in which the first buoyant element is supported.

No references cited.